(12) United States Patent
Teichner et al.

(10) Patent No.: US 7,428,022 B2
(45) Date of Patent: Sep. 23, 2008

(54) MULTIPATH VIDEO RECEPTION SYSTEM

(75) Inventors: Detlef Teichner, Königsfeld (DE); Hermann Link, Donaueschingen (DE); Philipp Wöhrle, Triberg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 626 days.

(21) Appl. No.: 11/001,633

(22) Filed: Nov. 30, 2004

(65) Prior Publication Data

US 2005/0128362 A1 Jun. 16, 2005

Related U.S. Application Data

(63) Continuation of application No. PCT/EP03/05759, filed on Jun. 2, 2003.

(51) Int. Cl.
*H04N 5/44* (2006.01)
*H04N 5/455* (2006.01)

(52) U.S. Cl. .................. 348/725; 348/726; 348/731; 348/554

(58) Field of Classification Search .............. 348/725, 348/726, 554, 555, 727, 728, 731–733; 375/286, 375/316, 347; *H04N 5/44, 5/455, 5/46, 5/50*
See application file for complete search history.

(56) References Cited

U.S. PATENT DOCUMENTS 5,303,396 A 4/1994 Ooyagi et al. .............. 455/134
5,940,452 A 8/1999 Rich .......................... 375/347
6,005,605 A 12/1999 Kostreski et al. ............. 348/21
6,577,353 B1 * 6/2003 Welles et al. ................ 348/725
6,603,517 B1 * 8/2003 Shen et al. .................. 348/554
6,741,293 B1 * 5/2004 Obuchi ....................... 348/554

FOREIGN PATENT DOCUMENTS

DE 199 29 284 A 1 1/2001
EP 1 162 836 A2 5/2001
WO WO 01/198075 A2 3/2001

OTHER PUBLICATIONS

European Patent Office Search Report regarding Application No. PCT/EP 03/05759, dated Aug. 27, 2003, 2 pages.

* cited by examiner

*Primary Examiner*—Sherrie Hsia
(74) *Attorney, Agent, or Firm*—Brinks Hofer Gilson Lione

(57) ABSTRACT

A system is presented for the multipath reception of video signals, including sound an/or image signals. The system includes at least two receivers and a diversity unit. At least one receiver receives and processes analog video signals, while the one or more remaining receivers receive and process digital video signals. The system may further include an analog selector unit for selecting the highest quality analog signal, and/or a digital selector unit for selecting the highest quality digital signal. The diversity unit receives the processed analog and digital video signals and combines them to produce a resulting video signal having a quality at least as high as the better of the processed analog and digital video signals. The diversity unit may combine the received video signals by performing a weighted addition of the signals.

29 Claims, 6 Drawing Sheets

MULTIPATH VIDEO RECEPTION SYSTEM

PRIORITY CLAIM

This application is a continuation application and claims priority based on PCT Application No. PCT/EP03/05759, filed Jun. 2, 2003, which claims the benefit of the filing date of German Patent Application No. DE 102 24 536.3, filed May 31, 2002. The disclosures of the above applications are incorporated herein by reference.

BACKGROUND OF THE INVENTION

1. Technical Field

The invention relates to a system for the multipath reception of video signals, such as television signals, which may include image and/or sound signals.

2. Related Art

Multipath reception includes the reception of electromagnetic ("EM") signals on one of several transmission paths or channels. Multipath reception of EM signals, including broadcast signals, may be accomplished using antenna diversity, and/or frequency diversity. Antenna diversity includes the use of one or more antennas. Frequency diversity includes reception on one of several receiver frequencies.

An antenna diversity receiver system is an EM receiving system that includes an EM receiver, which may be connected to one of several antennas. The antennas may be spatially separated. The EM receiver may include a telephone system, and/or a broadcast receiver, such as a television receiver or a telephone system. In addition, the EM receiver may include a selector switch that connects one of the antennas to the EM receiver on the basis of specified criteria, such as reception field strength and the interference, to receive the signal at an acceptable level of quality. This type of antenna diversity receiver system may be used in vehicles to receive broadcast signals, such as television signals. When used in vehicles, an antenna diversity receiver system may include window antennas integrated into the windows of the vehicle.

A frequency diversity receiver system is an EM receiving system that may include at least two radio receivers. One radio receiver may be an operating receiver, while the other radio receiver may be a search and test receiver that searches for alternative reception frequencies and tests the reception quality at those frequencies. If the search receiver finds an alternative reception frequency that provides a better reception quality than the current reception frequency, either the operating receiver is tuned to the alternate reception frequency or the search and operating receivers exchange roles. If the search and operating receivers exchange roles, the search receiver stays tuned to the alternate reception frequency and assumes the role of the operating receiver. The operating receiver assumes the role of the search receiver and thus searches for alternative reception frequencies and tests the reception quality at those frequencies. Frequency diversity receiver systems are suitable for use in vehicles because as the vehicle moves, the reception conditions may change as result of the changing surroundings.

Antenna and frequency diversity may be used in combination, for example, in a combined diversity reception system. A combined diversity reception system may include several antennas and receivers. The combined diversity reception system may also include a selector switch that may place the antennas in communication with the receivers in any combination.

Digital receiver systems, used for receiving digital broadcast signals, are becoming more widely used because an increasing number of radio and television programs are being broadcast digitally, for example using "Digital Video Broadcasting—Terrestrial" or "DVB-T."

SUMMARY

Digital broadcast signals, such as video and television, are becoming more popular and may one day replace analog signals. However, digital video signals require special digital receiver systems for reception, and may not be implemented in all locations. Therefore, there is a need for reception systems that process both analog and digital broadcast signals, such as analog and digital video signals. This need is particularly acute for mobile receivers, such as those used in vehicles, A system, which may include, methods, circuits, modules and units, for the multipath reception of broadcast signals, has been developed that reproduces the signal with significantly higher quality than that of traditional diversity receiver systems. The terms "television signal" and "video signal" are used interchangeably in this document to refer to image and/or sound signals. This multipath video reception system includes at least two receivers and may include at least one antenna. At least one of the receivers receives and processes analog video signals and at least one of the receivers receives and processes digital video signals. Each receiver may include an automatic gain control for regulating the level of the received video. signal. Each receiver may also include an analog demodulator and a digital demodulator for demodulating analog and digital video signals, respectively. The system may also include an antenna selector network that places the receivers in communication with the antenna or antennas.

If the system includes more than one demodulator for demodulating analog video signals, the system may include an analog selector unit that selects the demodulated analog video signal with the highest reception quality. Likewise, if the system includes more than one demodulator for demodulating digital video signals, the system may include a digital selector unit that selects the demodulated digital video signal with the highest reception quality.

The digital selector unit may include a second diversity unit, one or more demultiplexers, a third diversity unit and a decoder. If the digital demodulators provide a package-oriented MPEG multi-program transport stream ("MPTS"), the digital selector unit may include an MPTS diversity unit, and an MPEG decoder. The MPTS diversity unit may select the MPEG multi-program transport stream having fewer faulty packages, and forward the selected MPEG multi-program transport stream to the MPEG decoder.

In addition, each of the output signals from the MPTS diversity unit may be demultiplexed by one or more demultiplexers into single program (transport) streams ("SPTS"). The output signals of the one or more demultiplexers may be communicated to an SPTS, PES or ES diversity unit which selects the data stream with the best quality from SPTS, package-oriented elementary streams ("PES") or pure elementary streams ("ES").

The digital demodulators may provide a package-oriented MPEG multi-program transport stream, abbreviated to MPTS, to an MPTS diversity unit, which selects an MPEG multi-program transport stream with fault-free packages and forwards it to an MPEG decoder.

The demodulated analog and digital video signals, or those selected by an analog selector unit and/or a digital selector unit may be communicated to a diversity unit. The diversity unit may digitize the analog video signal, synchronize the analog and digital video signals, and/or combine the received analog and digital image signals. The diversity unit may combine the analog and digital signals using a weighted addition to produce a video signal with quality at least as high as the qualitatively better of the analog and digital signals. The resultant video signal may equal the analog video signal, the digital video signal, or a combination of the analog and digital signals. The weighted addition of the two signals may be performed in the frequency or time domain. When the weighted addition is performed in the frequency domain, the low-frequency portion of the digital video signal may be combined with the high-frequency portion of the analog video signal, or vice versa. In contrast, the combination or diversity may take place between a chrominance signal and a luminance signal.

The system may include a control unit that controls the other components of the system, including the following in any combination: the antenna s elector network, the receivers, the analog selector unit, the digital selector unit, the diversity unit, and the output unit.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
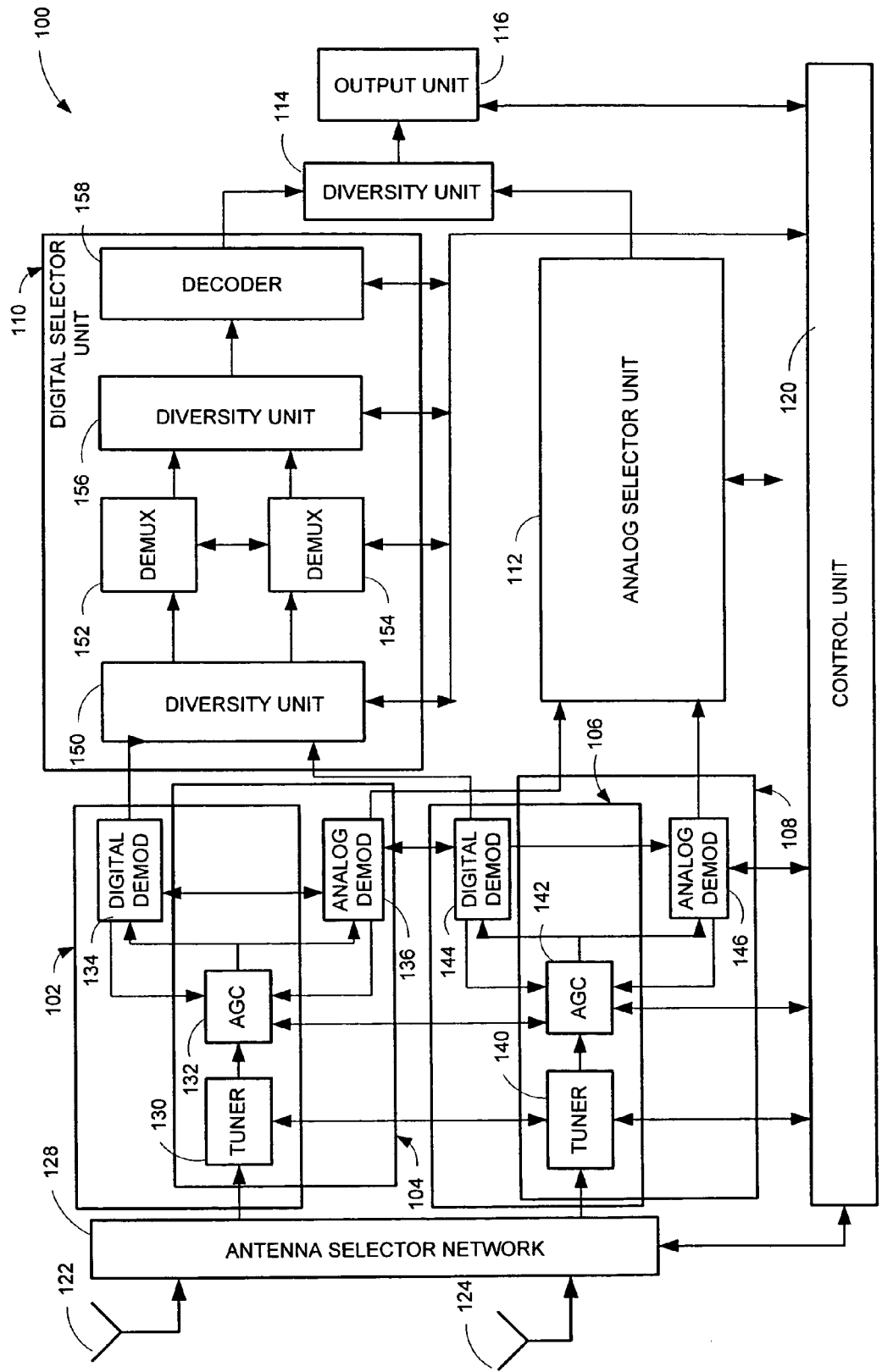
FIG. 1 is a block diagram of a multipath video reception system.

A multipath video reception system is shown in FIG. 1. In general, the system 100 receives and processes electromagnetic ("EM") signals, such as video signals. The system 100 may process the image part and the sound part of the video signal separately because the image signal contains vertically synchronous signals and horizontally synchronous signals. The system 100 may be used for mobile reception under difficult, frequently changing reception conditions, for example, in a vehicle. However, the system 100 is not limited to mobile use and may be used in a fixed environment, such as a home or office.

Although the system 100 as shown includes a specified number of components, the number of any of the components is shown for exemplary purposes only. Any of the components of the system may be included in any number. The system 100 may include a first and a second analog receiver 104, 108, respectively, a digital selector unit 110, an analog selector unit 112, and a first diversity unit 114. The system may also include a first antenna 122, a second antenna 124, and an antenna selector network 128. The first and second antennas 122, 124, respectively, may be attached to inputs of the antenna selector network 128. The antenna selector network 128 may have any number of inputs and outputs. For example, the antenna selector network 128 may include a number of inputs equal to the number of antennas. The number of outputs may equal the number of inputs. The antenna selector network 128 places the first and second antennas 122, 124, respectively, in communication with the first and second analog receivers 104, 108, respectively, and the first and second digital receivers 102, 106, respectively.

The receivers 102, 104, 106, and 106 may each include a tuner, an automatic gain control ("AGC"), and a demodulator. The first digital receiver 102 may include a first tuner 130, a first AGC 132, and a first digital demodulator 134. The second digital receiver 106 may include a second tuner 140, a second AGC 142, and a second digital demodulator 146. The first analog receiver 104 may include a first tuner 130, a first AGC 132, and a first analog demodulator 136. The second analog receiver 108 may include a second tuner 140, a second AGC 142, and a second digital demodulator 146. The first analog receiver 104 and the first digital receiver 102 may share a tuner 130 and/or an AGC 132, or may each include a separate tuner and/or AGC. Likewise, the second analog receiver 108 and the second digital receiver 106 may share a tuner 140 and/or an AGC 122, or may each include a separate tuner and/or AGC.

In each receiver 102, 104, 106, and 108, the output of each tuner 130 and 140 may be in communication with the input of an AGC 132 and 142, respectively. The output of each AGC 132, 142 may be in communication with the input a digital demodulator and an analog demodulator. For example, the output of AGC 132 may be in communication with a first digital demodulator 134 and a first analog demodulator 136. In a similar manner, the output of AGC 142 may be in communication with a second digital demodulator 144 and a second analog demodulator 146. The outputs of the first and second digital demodulators 134, 146, respectively, may be in communication with the inputs of a digital selector unit 110.

The digital selector unit 110 may include a second diversity unit 150, first and second demultiplexers 152, 154, respectively, a third diversity unit 156, and a decoder 156. The second diversity unit 150 may include a multi-program transport stream ("MPTS") diversity unit for single-program transport steams ("STPS"), package-oriented elementary streams ("PBS"), or pure elementary steams ("ES"). The first and second demultiplexers 152, 154, respectively, may include an MPTS demultiplexer with a program filter. The outputs of the first and second demultiplexers 152, 154, respectively, may be in communication with the inputs of the third diversity unit 156. The third diversity unit 156 may include an STPS, PBS, or ES diversity unit that includes a delay balance module. The output of the third diversity unit 156 may be in communication with the input of the decoder 158, which may include an MPEG decoder. The output of the decoder 158 may be in communication with an input of the first diversity unit 114. The first diversity unit 114 may include an image and sound diversity unit that includes a delay balance module.

The outputs of the first and second analog demodulators 136, 146, respectively, may be in communication with the inputs of an analog selector unit 112, the output of which may be in communication with an input of the first diversity unit 112. The analog selector unit 112 may use methods for diversity reception of image and sound signals.

The system may also include a control unit 120. The control unit 120 may include any type of processor that manipulates digital data. Further, each of the following components may include a control input through which each may be in communication with the control unit 120 in any combination: the antenna selector network 128, the first and second tuners 130, 140, respectively, the first and second AGC 132, 142, respectively, the first and second digital demodulators 134, 144, respectively, the first and second analog demodulators 136, 146, respectively, the first, second, and third diversity units 114, 150, 156, respectively, the first and second demultiplexers 152, 154, respectively, the decoder 158, the analog selector unit 112. The control unit 120 may produce a control signal by which the control unit 120 controls the operation of the other components of the system 100.

The system 100 may further include an output unit 116, which may be in communication with the output of the first diversity unit 112, and the control unit 120. The output unit 116 may include any type of visual, manual, audio, electronic or electromagnetic device capable of communicating information from a processor or memory to a person, processor, or memory. Examples of output units 116 include, but are not limited to, monitors, speakers, liquid crystal displays, networks, buses, and interfaces. The output unit may also include devices that enable the input of information into the system. These input devices may include any type of visual, manual, mechanical, audio, electronic, or electromagnetic device capable of communicating information from a person, memory, or processor. Examples of input devices include keyboards, microphones, voice recognition systems, trackballs, mice, networks, buses, and interfaces. Alternatively, the output unit 116 may include input and output functionality in a single device such as a touch screen, computer, processor or memory.

The antenna selector network 128, may place the first and second antennas 122, 124, respectively, in communication with the first and second analog receivers 104, 108, respectively, and the first and second digital receivers 102, 106, respectively, as required, with one exception. The antenna selector network 128 may be controlled by the central control unit 120.

The first and second AGC 132, 142, respectively, maintain the signals produced by the first and second tuners 132, 142 at about a predetermined level thereby making any subsequent demodulation and processing less complicated. The predetermined level to which the signals produced by the first and second tuners 132, 142 are maintained may include a constant value. The signals produced by the first and second tuners 132, 142 and maintained by the first and second AGC 132, 142, respectively, may b e demodulated digitally by the first and second digital demodulators 134, 144, respectively. These signals may also be demodulated in an analog manner by the first and second analog demodulators 136, 146, respectively.

The demodulated analog signals produced by the first and second analog demodulators 136, 145 may be communicated with the analog selector unit 112. The analog selector unit 112 may select the demodulated analog signal with the highest quality based on one or more criteria, such as signal strength or interference, and may communicate the highest quality demodulated analog signal to the first diversity unit 114. In addition, the analog selector unit 112 may communicate a quality criterion to the control unit 120, which may use the quality criterion to control one or more of the components of the system 100. The highest quality demodulated analog output signal may be digitized by the analog selector unit 112 or in the first diversity unit 114.

The demodulated digital output signals produced by the first and second digital demodulators 134, 144, may be communicated with the digital selector unit 110. The digital selector unit 110 may select the demodulated digital signal with the highest quality, and may communicate the highest quality demodulated digital signal to the first diversity unit 114.

The first diversity unit 114 may synchronize the image and sound parts of the video signal, synchronize the analog and digital video signals, and/or combine the analog and digital video signals. The first diversity unit 114 may include a delay balance module for balancing the running time difference between the received analog and digital video signals. The delay balance module may first roughly synchronize the signals, and then more precisely synchronize the signals. The delay balance module may roughly synchronize the received analog and digital signals by correlating the sound part of these signals. The sound parts of the received analog and digital signals may be low-pass filtered, combined with each other and displaced in time so that they coincide. The corresponding video signals may then be roughly synchronized by displacing them in time by an amount that equals the time displacement of the corresponding sound signal. This rough synchronization may be carried out at about 100 μsec. The delay balance module may then correlate the received analog and digital video signals more precisely by comparing the image and/or line synchronization signals (see FIG. 4) of the received analog and digital video signals and displacing either or both of the received analog and digital video signals in time so that the image and/or line synchronization signals of each coincide. The fine correlation is carried out at about 100 to 200 nsec precisely at least.

In the first diversity unit 114, the image part and the sound part of the received analog and digital video signals may be evaluated separately, so that the image part of one of the received video signals may be combined with the audio part of the other received video signal. In general, a relatively good sound signal may be derived from the analog video signal even if no sound signal is present in the digital video signal. Therefore, the first diversity unit 114 may use the sound part of the analog video signal, unless the sound part of the digital video signal includes a higher quality in the relevant time section.

The first diversity unit 114 may synchronize the image and sound parts of the video signal, synchronize the analog and digital video signals, and/or combine the analog and digital video signals. The first diversity unit 114 may include a delay balance module for balancing the running time difference between the received analog and digital video signals. The delay balance module may first roughly synchronize the signals, and then more precisely synchronize the signals. The delay balance module may roughly synchronize the received analog and digital signals by correlating the sound part of these signals. The sound parts of the received analog and digital signals may be low-pass filtered, combined with each other and displaced in time so that they coincide. The corresponding video signals may then be roughly synchronized by displacing them in time by an amount that equals the time displacement of the corresponding sound signal. This rough synchronization may be carried out at about 50 μsec to about 100 μsec. The delay balance module may then correlate the received analog and digital video signals more precisely by comparing the image and/or line synchronization signals (see FIG. 4) of the received analog and digital video signals and displacing either or both of the received analog and digital video signals in time so that the image and/or line synchronization signals of each coincide. The fine correlation is carried out at about 50 to about 200 nsec precisely at least.

Alternatively, the first diversity unit 114 may combine the received analog and digital signals by applying a weighing factor to the received signals and adding the weighted signals together (a weighted addition of the received analog and digital signals). A weighing factor may be applied to both the received analog and digital signals. In general, the weighing factors are chosen so that the signal produced by the first diversity unit 114 has a quality as high, or higher, than that of the better of the two received signals. These weighing factors may include values from about 0 to about 1. The weighing factors may be unequal. For example, the weighing factor applied to one of the received signals may be 1, while the weighing factor applied to the other received signal may be 0.

The weighting may be quantized. This means that the received analog signal (which may be digitized) may be added 100%, 0% or by any percentage in between to the received digital signal, depending on the quality of the received analog signal. If the received digital signal is optimal and the received analog signal has been corrupted, the received digital signal may be multiplied by 1 and the received analog signal may be multiplied by 0. This produces a signal equal to the received digital signal. Other weighting factors between about 0 and about 1 may also be used. In another example, both weighing factor may equal about 0.5. Switching over from one of the received signals to the other received signal or to a new signal may be carried out at predetermined time intervals, because the reception conditions may change from one time interval to the next.

Figure 5:
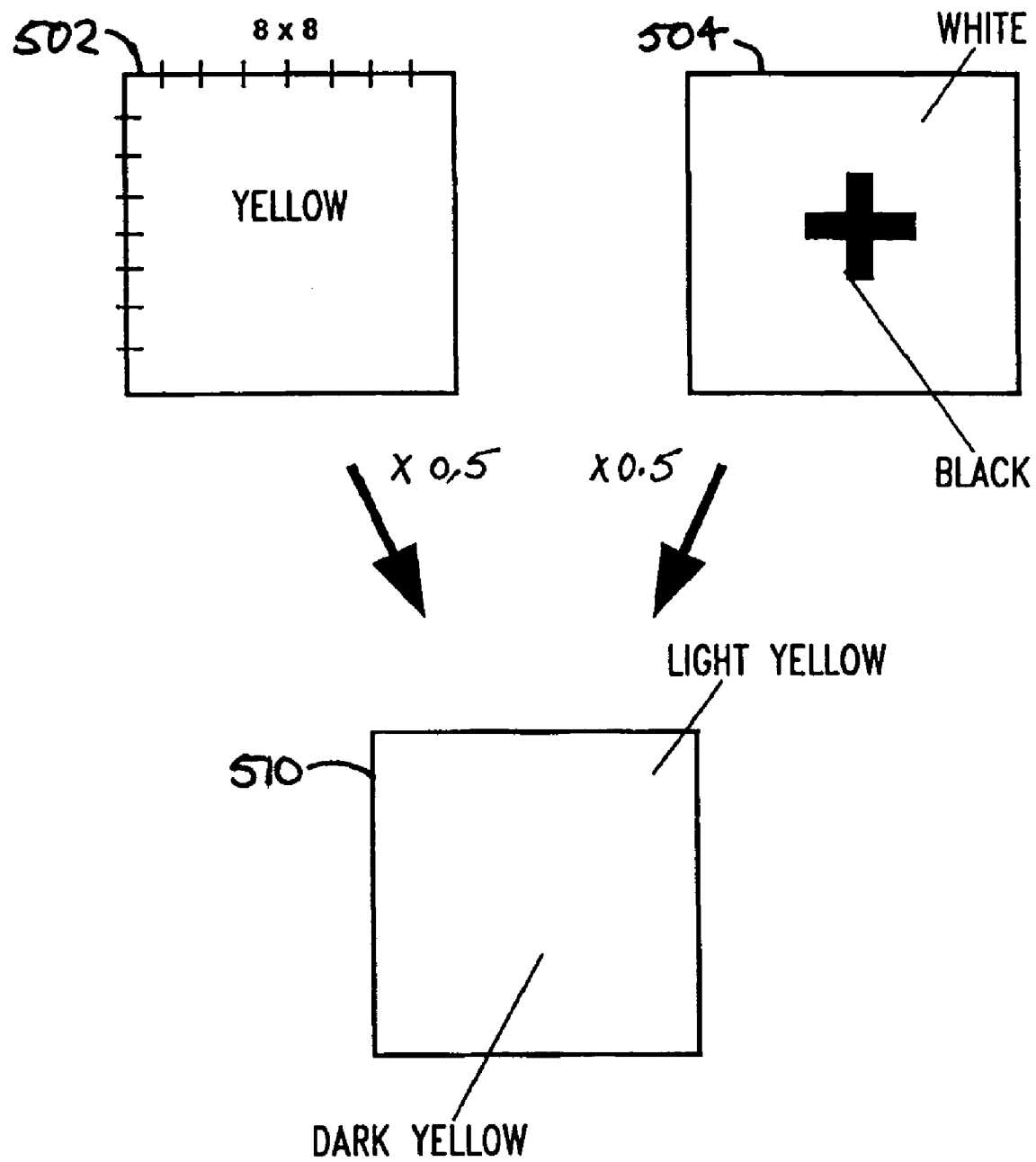
FIG. 5 is a diagram of a weighted addition of two image signals, each including a luminance signal and a chrominance signal, on the basis of an 8×8 pixel.

If the received analog and digital signals are video signals, the first diversity unit 114 may perform a weighted addition of the luminance and chrominance signals included in each of these received signals. An example of such a weighted addition is shown in FIG. 5. In this example, a digital image signal 502 defining an 8×8 pixel block, is produced by a digital selector unit (see FIG. 1, reference number 110) and an analog image signal 504 is produced by a an analog selector unit (see FIG. 1, reference number 112). Both the analog and digital image signals represent the same image at the same point in time. However, while the digital image signal 502 displays the proper color value, which in this case is yellow, it does not display any image structure. In contrast, the analog image signal displays an image structure, which in this case includes the outlines of a cross in black and white, but does not include any color information. In some situations, such as during analog television reception, the color information may be lost even though the image structure is retained in black and white because of the type of modulation used to modulate the color signal. The analog and digital image signals 502, 504, respectively may each be multiplied by a weighing factor of, for example 0.5 506, 508, respectively, and added to yield a new signal 510. The new signal 510 for this 8×8 pixel block displays the cross against a light yellow background.

Figure 6:
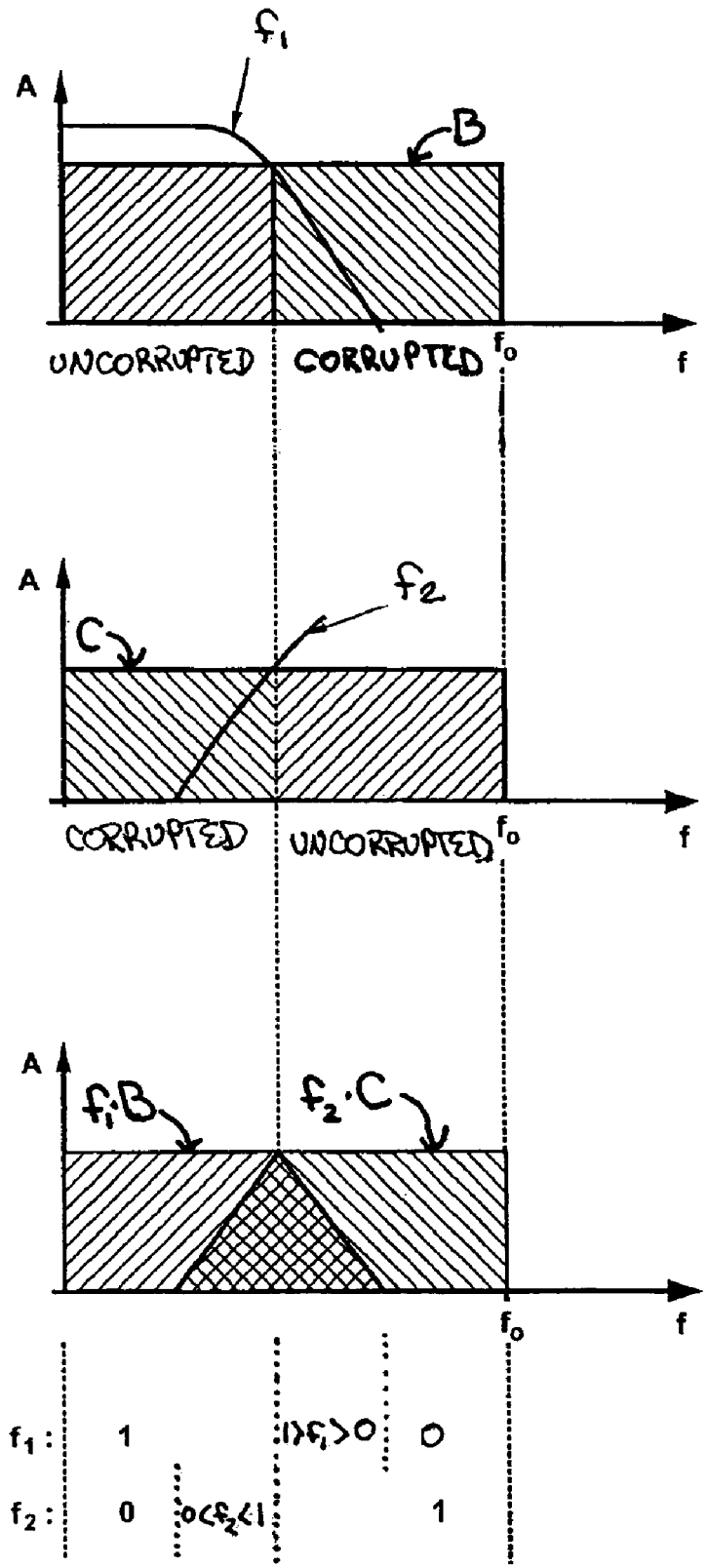
FIG. 6 is a diagram of a weighted addition of two image signals in the frequency domain.

An example of a weighted addition of analog and digital signals in the frequency domain is shown in FIG. 6. In this case, the low-frequency section of the digital image signal and the higher frequency section of the analog image sections from the analog image signal are added to each other. It is assumed that one signal path B, such as in the analog channel, has been corrupted in the upper frequency range, and the other signal path C, such as the digital channel, has major interference in the lower frequency range. The corrupted frequency bands are therefore filtered out or blocked with suitable filters. In this case, the signal path C is filtered by a low-pass filter $f_1$ and the signal path D is filtered by a high-pass filter $f_2$. The resulting filtered signal paths $f_1 \cdot B$ and $f_2 \cdot C$ are mixed to combine the less corrupted parts of each channel in signal path D, where $D = f_1 \cdot B + f_2 \cdot C$. This addition of the signals is described as addition in the frequency range. Filtering can also be carried out using band-pass filters.

Figure 2:
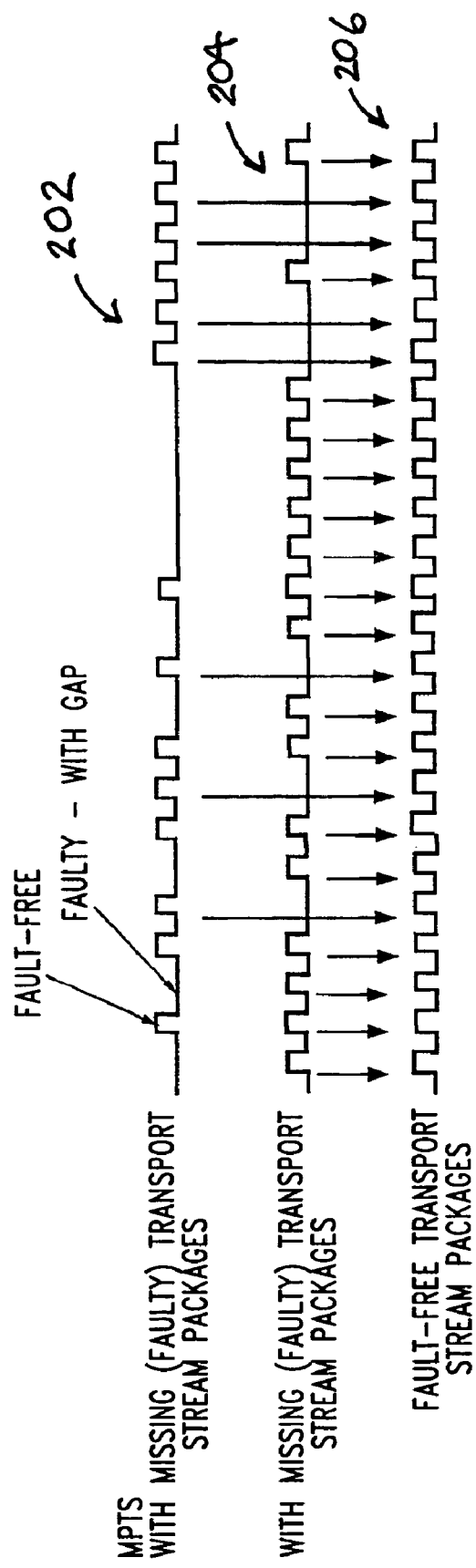
FIG. 2 is a diagram of transport stream packages received and produced by the second diversity unit of the system of FIG. 1.
Figure 3:
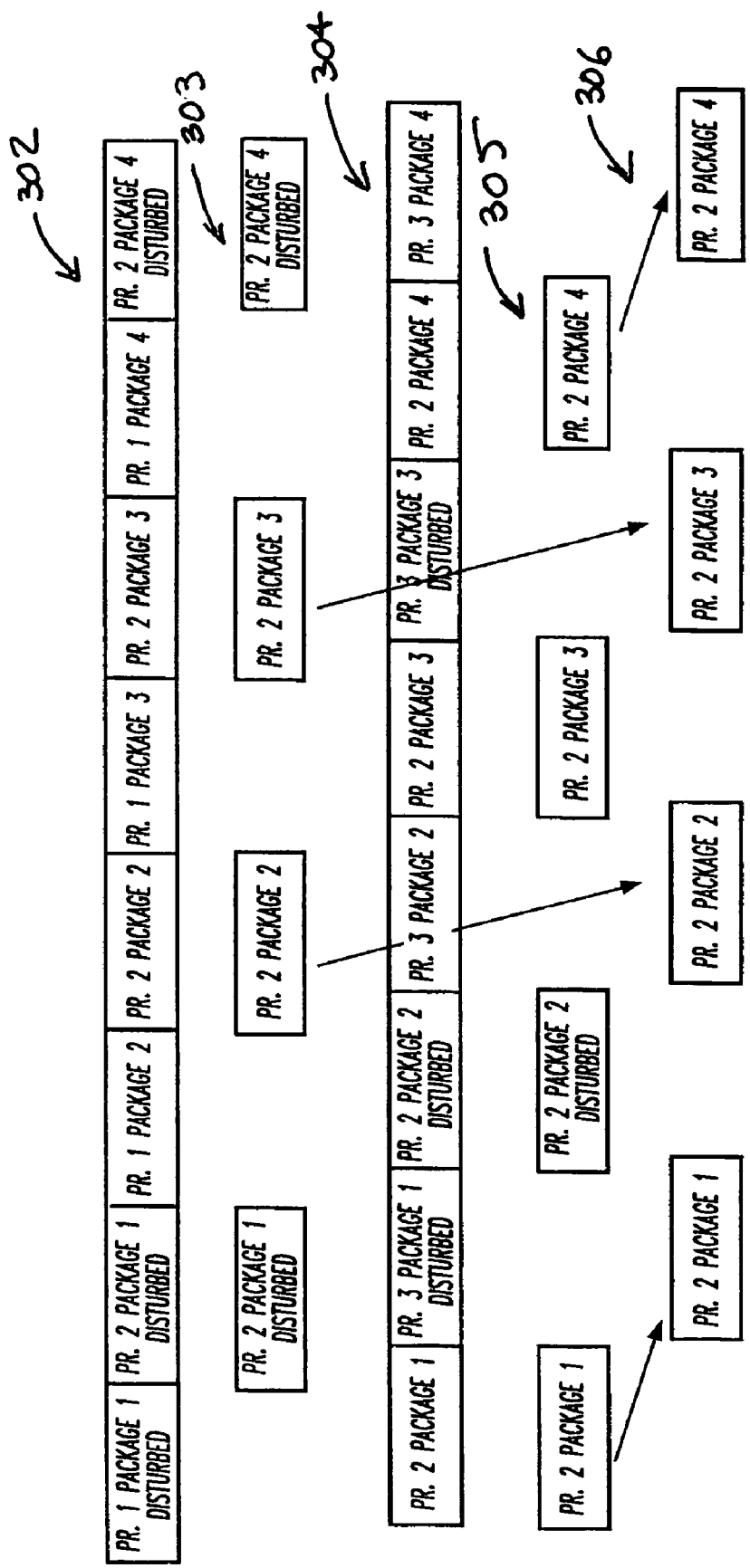
FIG. 3 is a diagram of data packages received and produced by the third diversity unit of the system of FIG. 1.

Referring to FIGS. 1, 2, and 3, the operation of the digital selector unit 110 when the digital demodulators 134, 144 produce package-oriented MPEG multi-program transport streams ("MPTS"), will be described in connection with FIGS. 2 and 3. In general, the second diversity unit 150 of the digital selector unit 110 selects fault-free packages for further processing, and the third diversity unit 156 of the digital selector unit 110 compensates for running time differences between the program streams supplied by the digital demodulators 134, 144.

FIG. 2, shows the way in which the second diversity unit 150 combines multi-program transport streams to optimally produce a fault-free or nearly fault-free multi-program transport stream. In FIG. 2, three MPTS are shown. A greater or lesser number of MPTS may be used. The first MPTS 202 and the second MPTS 204 both include faulty packages, which are therefore missing from MTPS 202 and MTPS 204, respectively. If, at each point in time, a fault-free package is available from one of the MTPS 202, 204, the second diversity unit 150 may combine the MTPS 202, 204, to create a new MPTS 206, which, in the best case, contains only fault-free transport stream packages.

However, if no fault-free packages are available to the second diversity unit 150, the individual MPEG multi-program transport streams are communicated with the first and second demultiplexers 152, 154, respectively, and demultiplexed. The MPEG multi-program transport streams showing faulty packages may be divided into individual single-program transport streams, which may be accomplished using a program identifier contained in every transport stream package. For example, the individual single-program transport streams may be filtered out using filters included in the first and second demultiplexers 152, 154, respectively. This is possible even if the same program is received from different broadcasts on different frequencies. The signals produced by the first and second demultiplexers 152, 154, respectively, may be communicated with the third diversity unit 156, which may process the individual program transport streams. This process also applies to package-oriented elementary streams and pure non-package-oriented elementary streams.

FIG. 3 shows a way in which the third diversity unit 156 may produce a less faulty stream of transport packages from streams of transport packages that include faulty packages. The first stream of transport packages 302 and the second stream of transport packages 304 may be supplied by the first and second demultiplexers 152, 154, respectively.

The first stream of transport packages 302 includes packages from a first program PR1 and a second program PR2. In the first stream of transport packages 302, package 1 of program Pr1 and program Pr2, and package 4 of program Pr2 are corrupted. However, packages 2 and 3 of program Pr1 and program Pr2, and package 4 of program Pr1 are uncorrupted. Using a filter, a demultiplexer, such as the first demultiplexer 152, may separate out the packages of program Pr2 from the first stream of transport packages 302 to create a first single program transport stream 303. The first single program transport stream 303 may include program Pr2 packages 303 include the corrupted packages 1 and 4, and the uncorrupted packages 2 and 3 of program Pr2.

The second stream of transport packages 304 may contain packages from the program Pr2 and a program Pr3. In the second stream of transport packages 304, packages 1, 3 and 4 of program Pr2 may be uncorrupted, while packages 1 and 3 of program Pr3, and package 2 of program Pr2 may be corrupted. Using a filter, a demultiplexer, such as the second demultiplexer 154, may separate out the packages of program Pr2 from the second stream of transport packages 304 to create a second single program transport stream 305. This second single program transport stream includes uncorrupted packages 1, 3 and 4, and corrupted package 2 of program Pr2.

The third diversity unit 156 may then combine the uncorrupted package 1 of Pr2 from the second single transport stream 305, the uncorrupted packages 2 and 3 of Pr2 from the first single transport stream 303, and the uncorrupted package 4 of Pr2 from the second single transport stream 305 to create a new transport stream 306. This new transport stream 306 is fault-free or includes fewer faults, and may be decoded by an MPEG decoder, and communicated with the first diversity unit 114.

Figure 4:
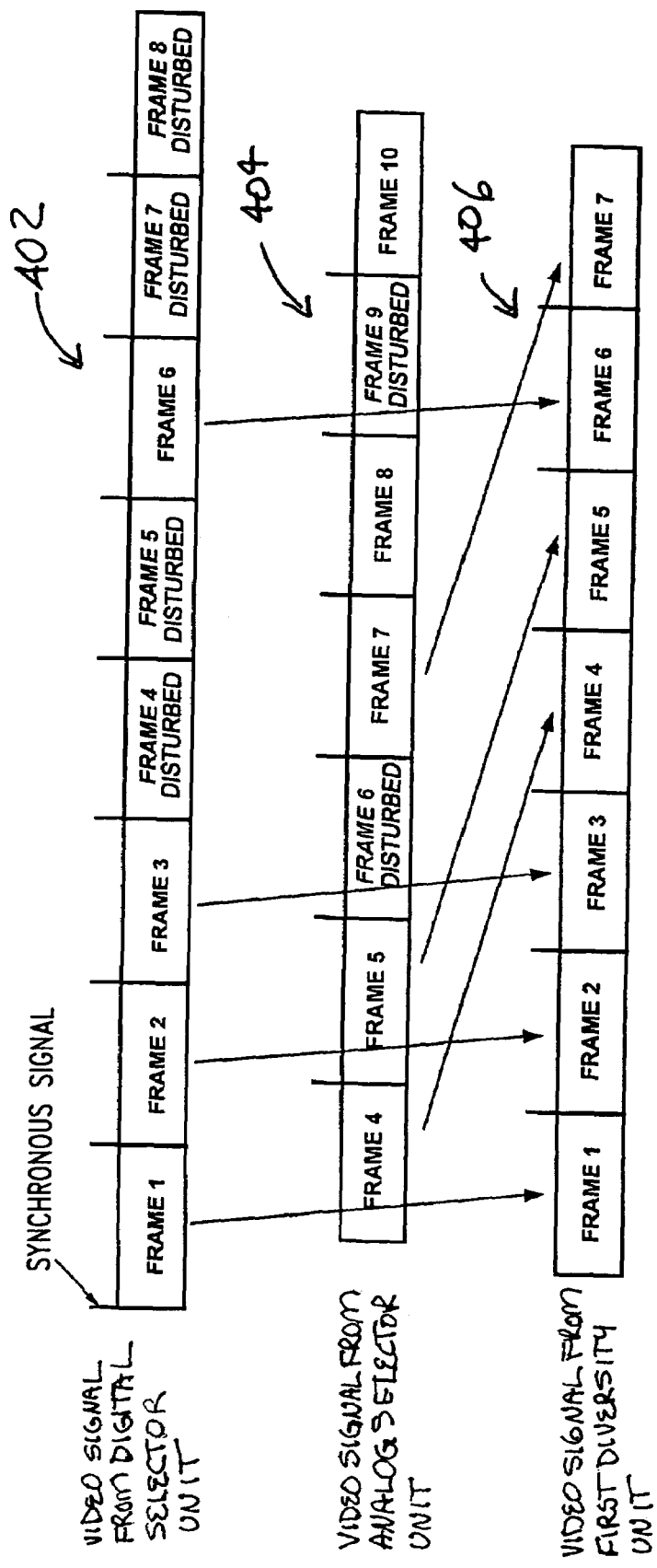
FIG. 4 is a diagram of data packages received and produced by the first diversity unit of the system of FIG. 1.

An example of a way in which a diversity unit (see FIG. 1, reference number 114) may produce an optimum image and/or sound signal from the signal supplied by a digital selector unit and the signal supplied by an analog selector unit (see FIG. 1, reference numbers 110, 112, respectively) is shown in FIG. 4. Although the example of FIG. 4 is discussed in terms of a video signal, the example applies to sound and image signals. In the example of FIG. 4, a video signal 402 supplied by the digital selector unit includes frames 1 to 8, of which frames 1, 2, 3 and 6 are uncorrupted, while frames 4, 5, 7 and 8 are corrupted. A video signal 404 supplied by an analog selector unit includes frames, 4 through 10, of which frames 4, 5, 7, 8 and 10 are uncorrupted, while frames 6 and 9 are corrupted. The uncorrupted frames of video signals 402 and 404 signals may be combined by a diversity unit to produce a video signal 406 that includes frames that are fault-free or that contain fewer faults.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for multipath reception of a video signal, comprising:
a first analog receiver configured to receive an analog video signal and produce a first demodulated analog video signal that includes a first quality level;
a first digital receiver configured to receive a digital video signal and produce a first demodulated digital video signal that includes a second quality level; and
a diversity unit in communication with the first analog and digital receivers, and configured to determine which of the first and second quality levels includes a higher quality level and combine the first demodulated analog and digital video signals to reproduce the video signal with a third quality level approximately equal to at least the higher quality level.

2. The system of claim 1, where the diversity unit is further configured to combine the first demodulated analog and digital video signals by weighted addition of the first demodulated analog and digital video signals.

3. The system of claim 2, where the diversity unit is further configured to combine the first demodulated analog and digital video signals by weighted addition in the frequency domain.

4. The system of claim 3, where the first demodulated analog and digital video signals include a low frequency part and a high frequency part, and the diversity unit is further configured to combine the first demodulated analog and digital video signals by weighted addition of the low frequency part of the first demodulated analog video signal and the high frequency part of the first demodulated digital video signal.

5. The system of claim 3, where the first demodulated analog and digital video signals include a low frequency part and a high frequency part, and the diversity unit is further configured to combine the first demodulated analog and digital video signals by weighted addition of the low frequency part of the first demodulated digital video signal and the high frequency part of the first demodulated analog video signal.

6. The system of claim 2, where the diversity unit is further configured to combine the first demodulated analog and digital video signals by weighted addition in the time domain.

7. The system of claim 2, where the first demodulated analog and digital video signals include a chrominance part and a luminance part, and the diversity unit is further configured to combine the first demodulated analog and digital video signals by weighted addition of the chrominance and luminance parts.

8. The system of claim 2, where the first demodulated analog and digital video signals include an image signal and a sound signal, and the diversity unit is further configured to combine the image signal and the sound signal.

9. The system of claim 2, where the weighted addition is quantized.

10. The system of claim 2, where the diversity unit includes a delay balance module configured to synchronize the first demodulated analog video signal and the first demodulated digital video signal.

11. The system of claim 10, where the delay balance module is further configured to synchronize the first demodulated analog video signal and the first demodulated digital video signal by performing a first synchronization and a second synchronization.

12. The system of claim 11, where the first demodulated audio and video signals include a sound part and an image part, and the first synchronization includes synchronizing the sound part.

13. The system of claim 11, where the first synchronization is performed over a duration of a number of image lines.

14. The system of claim 11, where the first synchronization is performed over a duration of about 50 μsec to about 100 μsec.

15. The system of claim 11, where the delay balance module is further configured to perform a fine running time adjustment.

16. The system of claim 11, where the first demodulated analog and digital video signals include an image synchronization signal, and the second synchronization includes synchronizing the image synchronization signal.

17. The system of claim 11, where the first demodulated analog and digital video signals include a line synchronization signal, and the second synchronization includes synchronize the line synchronization signal.

18. The system of claim 11, where the second synchronization is performed at about 50 nsec to about 200 nsec.

19. The system of claim 1, further comprising:
a second analog receiver configured to receive a second analog video signal and produce a second demodulated analog signal that includes a fourth quality level; wherein the first analog receiver includes a first analog demodulator configured to produce the first demodulated analog video signal; wherein the second analog receiver includes a second analog demodulator configured to produce the second demodulated analog video signal; and an analog selector unit in communication with the first and second analog demodulators, and configured to determine which of the first and second demodulated analog signals includes a higher quality level.

20. The system of claim 1, further comprising:
a second digital receiver configured to receive a second digital video signal and produce a second demodulated digital signal that includes a fourth quality level; wherein the first digital receiver includes a first digital demodulator configured to produce the first demodulated digital video signal; wherein the second digital receiver includes a second digital demodulator configured to produce the second demodulated digital video signal; and
a digital selector unit in communication with the first and second digital demodulators, and configured to determine which of the first and second demodulated digital signals includes a higher quality level.

21. The system of claim 20, where the first digital receiver produces a package-oriented MPEG multi-program transport stream and the second digital receiver produces a second package-oriented MPEG multi-program transport stream, and the system further comprises a multi-program transport stream diversity unit in communication with the first and second digital receivers and configured to select an MPEG multi-program transport stream with fewer faulty packages.

22. The system of claim 21, further comprising a demultiplexer in communication with the multi-program transport stream diversity unit and configured to demultiplex the MPEG multi-program transport stream with fewer faulty packages into at least one single program stream.

23. The system of claim 22, further including a second diversity unit in communication with the demultiplexer and configured to select from the at least one single program stream the single program stream with a highest quality package-oriented elementary stream.

24. The system of claim 23, further including an MPEG decoder in communication with the second diversity unit.

25. The system of claim 22, further including a second diversity unit in communication with the demultiplexer and configured to select from the at least one single program stream the single program stream with a highest quality pure elementary stream.

26. The system of claims 1, further compromising an antenna selector network in communication with the first analog and digital receivers and configured to couple at least one antenna with the first analog and digital receivers.

27. A method for the multipath reception of video signals, comprising:
receiving an analog video signal;
producing a first demodulated analog video signal including a first quality level as a function of the analog video signal;
receiving a digital video signal;
producing a first demodulated digital video signal including a second quality level as a function of the digital video signal;
determining which of the first and second quality levels includes a higher quality level; and
combining the first demodulated analog video signal and the first demodulated digital video signal to reproduce the video signal with a third quality level approximately equal to at least the higher quality level, where the first demodulated analog signal and the first demodulated digital video signal are combined by weighted addition of the first demodulated analog and digital video signals.

28. The method of claim 27, further comprising:
receiving a second analog video signal;
producing a second demodulated analog signal that includes a fourth quality level; and
determining which of the first and second demodulated analog signals includes a higher quality level.

29. The method of claim 27, further comprising:
receiving a second digital video signal;
producing a second demodulated digital signal that includes a fourth quality level; and
determining which of the first and second demodulated digital signals includes a higher quality level.

* * * * *

UNITED STATES PATENT AND TRADEMARK OFFICE
CERTIFICATE OF CORRECTION

PATENT NO. : 7,428,022 B2  Page 1 of 1
APPLICATION NO. : 11/001633
DATED : September 23, 2008
INVENTOR(S) : Detlef Teichner et al.

It is certified that error appears in the above-identified patent and that said Letters Patent is hereby corrected as shown below:

On the Title Page

Item (63), after filed on Jun. 2," replace "2003." with --2003, which claims the benefit of the filing date of German Patent Application No. DE 102 24 536.3, filed May 31, 2002.--.

In the Claims

In column 10, claim 17, lines 54-55, after "second synchronization includes" replace "synchronize" with --synchronizing--.

In column 12, claim 26, line 4, after "The system of" replace "claims 1" with --claim 1--.

Signed and Sealed this

Ninth Day of November, 2010

David J. Kappos
*Director of the United States Patent and Trademark Office*